United States Patent
Jang et al.

(10) Patent No.: US 10,227,909 B2
(45) Date of Patent: Mar. 12, 2019

(54) TURBOCHARGER ENGINE EXHAUST SYSTEM MOUNTED WITH GASKET HAVING DIFFERENCE IN CROSS SECTION HEIGHT

(71) Applicants: HYUNDAI MOTOR COMPANY, Seoul (KR); KIA MOTORS CORPORATION, Seoul (KR); WOLVERINE KOREA CO., LTD., Hwaseong-si, Gyeonggi-do (KR)

(72) Inventors: Chun-Soon Jang, Hwaseong-si (KR); Sang-Beom Kim, Yongin-si (KR); Myoung-Hurn Lee, Anyang-si (KR); Myung-Jin Cha, Dongducheon-si (KR)

(73) Assignees: HYUNDAI MOTOR COMPANY, Seoul (KR); KIA MOTORS CORPORATION, Seoul (KR); WOLVERINE KOREA CO., LTD., Hwaseong-si, Gyeonggi-do (KR)

( * ) Notice: Subject to any disclaimer, the term of this patent is extended or adjusted under 35 U.S.C. 154(b) by 480 days.

(21) Appl. No.: 14/925,896

(22) Filed: Oct. 28, 2015

(65) Prior Publication Data

US 2016/0177797 A1 Jun. 23, 2016

(30) Foreign Application Priority Data

Dec. 17, 2014 (KR) .................. 10-2014-0181966

(51) Int. Cl.
*F02B 33/44* (2006.01)
*F01N 13/18* (2010.01)
*F02B 37/00* (2006.01)

(52) U.S. Cl.
CPC ..... *F01N 13/1827* (2013.01); *F01N 13/1855* (2013.01); *F02B 37/00* (2013.01); *F01N 2340/06* (2013.01); *Y02T 10/144* (2013.01)

(58) Field of Classification Search
CPC ............ F01N 13/1827; F01N 13/1855; F01N 2260/10

See application file for complete search history.

(56) References Cited

U.S. PATENT DOCUMENTS 4,559,776 A * 12/1985 Arai ..................... F01N 3/28
60/280
5,360,219 A * 11/1994 Okuda ............. F01N 13/1827
277/592

(Continued)

FOREIGN PATENT DOCUMENTS

JP   H10-196792 A    7/1998
JP   2001-355732 A   12/2001

(Continued)

*Primary Examiner* — Ngoc T Nguyen
(74) *Attorney, Agent, or Firm* — Morgan Lewis & Bockius LLP

(57) ABSTRACT

A turbocharged engine exhaust system mounted with a gasket having a difference in cross section height includes a turbocharger rotatable by exhaust gasses discharged from an engine, and able to supply the engine with intake air through turbocharging, a warm-up catalytic converter (WCC) for removing hazardous substances in exhaust gasses discharged from the engine, and the gasket located between a turbocharger flange of the turbocharger and a WCC flange of the WCC, receiving a bolting force of stud bolts which pass through the turbocharger flange and the WCC flange, and operating such that the amount of compression strain of a sealing mass around a portion to which the bolting force is directly applied is greater than the amount of compression strain of the sealing mass in the remaining portion to which the bolting force is not directly applied.

5 Claims, 5 Drawing Sheets

(56) References Cited

U.S. PATENT DOCUMENTS

| | | | | |
|---|---|---|---|---|
| 9,850,800 B2* | 12/2017 | Jang | .................... | F01N 13/1822 |
| 2007/0217941 A1* | 9/2007 | Hayashi | ................ | C22C 38/001 |
| | | | | 420/38 |
| 2014/0217679 A1* | 8/2014 | Barrall | .................. | C23C 24/082 |
| | | | | 277/592 |
| 2014/0333036 A1* | 11/2014 | Kullen | ................ | F16J 15/0825 |
| | | | | 277/627 |
| 2016/0109045 A1* | 4/2016 | Jang | ......................... | F01N 3/28 |
| | | | | 285/189 |
| 2017/0022875 A1* | 1/2017 | Jang | .................... | F01N 13/1822 |

FOREIGN PATENT DOCUMENTS

| | | | | |
|---|---|---|---|---|
| JP | WO 2013141233 A1 * | 9/2013 | ............ | F01N 13/08 |
| KR | 10-2013-0131118 A | 12/2013 | | |
| KR | 10-1371462 B1 | 3/2014 | | |
| KR | 10-1372924 B1 | 3/2014 | | |

* cited by examiner

CROSS SECTION TAKEN ALONG LINE A-A

CROSS SECTION TAKEN ALONG LINE B-B

CROSS SECTION TAKEN ALONG LINE D-D

CROSS SECTION TAKEN ALONG LINE E-E

TURBOCHARGER ENGINE EXHAUST SYSTEM MOUNTED WITH GASKET HAVING DIFFERENCE IN CROSS SECTION HEIGHT

CROSS-REFERENCE TO RELATED APPLICATIONS

This application claims the benefit of priority to Korean Patent Application No. 10-2014-0181966, filed on Dec. 17, 2014 with the Korean Intellectual Property Office, which is incorporated herein by reference in its entirety.

TECHNICAL FIELD

Exemplary embodiments of the present disclosure relate to a turbocharged engine exhaust system, and particularly, to a turbocharged engine exhaust system capable of preventing a leak of exhaust gasses by applying a gasket which has improved durability by implementing a uniform sealing system with a difference between the height of the cross section of a bolting-force-concentrated portion and the height of the cross section of the remaining portion.

BACKGROUND

In general, environmental regulations require reduction of $NO_X$, CO/HC and the like, which are environmental pollutants. In order to meet these requirements, the exhaust systems of vehicles employ catalysts through a warm-up catalytic converter (WCC) or an under-floor catalytic converter (UCC).

Generally, in order to meet the requirements of environmental regulations, the catalytic performance in the WCC or UCC of reducing $NO_X$, CO/HC is important, and it is very important, as much as the catalytic performance, to prevent $NO_X$ and CO/HC from being discharged into the atmosphere due to leak of an exhaust line.

Preventing leaks from exhaust lines is important, particularly, in a turbocharged engine exhaust system in which a turbocharger and a WCC are directly connected to each other. This is because a gasket provided between the connection portions of the turbocharger and the WCC is directly exposed to high-temperature exhaust gasses flowing from the turbocharger to the WCC. Thus the damage risk of the sealing portion of the gasket increases due to a deterioration thereof.

For this reason, attempts to increase the joining force of the gasket to the connection portions of the turbocharger and WCC by employing a plurality of bolts to increase bolting force, and reducing the damage risk of the sealing portion due to high-temperature exhaust gasses by additionally applying a sealing material with strong heat resistance are used.

However, it is inevitable for the gasket to be continuously exposed to high-temperature exhaust gasses which causes deterioration thereof, and such an unfavorable condition accelerates deterioration of the sealing portion adhered to the WCC. Accordingly, the sealing performance between the WCC and the gasket is generally degraded as time passes.

In addition, since vibration due to a shaking of the engine is transferred to the turbocharged engine exhaust system, the turbocharged engine exhaust system is subject to vibrations in which the bolting force fixing the turbocharger, the gasket and the WCC decreases. In such a vibrational state in which the bolting force decreases, degradation of the sealing performance due to deterioration accelerates a loosening of the bolts, such that the sealing performance of the gasket is degraded, thereby increasing a risk of an exhaust gas leak.

Since such degradation of the performance of the gasket in the turbocharged engine exhaust system is inadequate to meet the requirements of environmental regulations such as LEV-III, EU6 and China 5, it is required to develop a gasket for preventing a leak of exhaust gasses in the turbocharged engine exhaust system.

SUMMARY OF THE DISCLOSURE

An embodiment of the present disclosure is directed to a turbocharged engine exhaust system mounted with a gasket having a difference in cross section height, which: can provide a uniform adhesion to the respective surfaces of a turbocharger and a WCC by forming a difference between the height of the cross section of a bolting-force-concentrated portion and the height of the cross section of the remaining portion in a state in which the gasket is bolted between the connection portions of the turbocharger and the WCC; and can prevent the bolting force from being weakened due to vibration of an engine by compensating, with the uniform adhesion, for damage by deterioration due to high-temperature exhaust gas, thereby preventing exhaust gas from leaking.

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

In accordance with an embodiment of the present disclosure, a turbocharged engine exhaust system mounted with a gasket having a difference in cross section height includes: a turbocharger is rotatable by exhaust gasses discharged from an engine, and supplies the engine with intake air through turbocharging; a warm-up catalytic converter (WCC) to remove hazardous substances of exhaust gasses introduced from an exhaust manifold connecting the engine to the turbocharger; and the gasket located between a turbocharger flange of the turbocharger and a WCC flange of the WCC, receiving bolting force of stud bolts which pass through the turbocharger flange and the WCC flange, and operating such that the amount of compression strain of a sealing mass around a portion to which the bolting force is directly applied is greater than the amount of compression strain of the sealing mass in the remaining portion to which the bolting force is not directly applied.

The difference in the amount of compression strain may be achieved by the sealing mass, and the sealing mass may be located between a sealing plate and a pressure plate, wherein the sealing plate and the pressure plate may be configured in a ring shape having a hoop with bored stud holes, in which the stud bolts are joined, and may overlap each other.

An inside edge of the sealing plate may be formed as an inside folded edge portion which is folded on an inside edge of the pressure plate, and an outside edge of the sealing plate may be formed as an outside folded edge portion which is folded on an outside edge of the pressure plate. The sealing plate may be provided on the inside edge thereof with a reinforcement core, and the sealing mass may be stacked on the reinforcement core. The pressure plate may be provided in the inside edge thereof with a step section, and the step section may be provided with a protruded sealing bead formed thereon. Stud cores may be joined in the stud holes of the sealing plate and pressure plate, and the stud cores may be provided on the inner circumferential surfaces thereof with female screws which are formed to be connected with the stud bolts. The sealing plate and the pressure plate may be made of stainless steel (SS). The sealing mass may be made of mica and by tone formation of 30-35% weight ratio.

DETAILED DESCRIPTION

Figure 1:
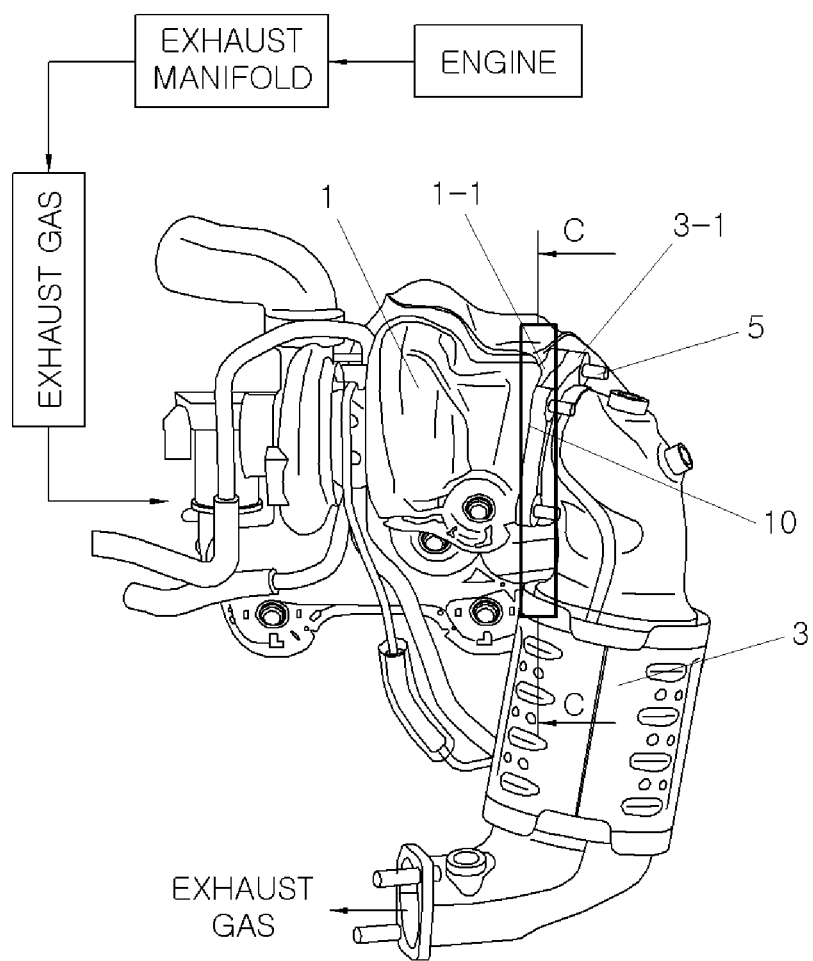
FIG. 1 is a view illustrating a configuration of a turbocharged engine exhaust system in which the connection portion between a turbocharger and a WCC is sealed by a gasket having a difference in cross section height in accordance with an embodiment of the present disclosure.

Exemplary embodiments of the present disclosure will be described below in more detail with reference to the accompanying drawings. The present disclosure may, however, be embodied in different forms and should not be construed as limited to the embodiments set forth herein. Rather, these embodiments are provided so that this disclosure will be thorough and complete, and will fully convey the scope of the present disclosure to those skilled in the art. Throughout the disclosure, like reference numerals refer to like parts throughout the various figures and embodiments of the present disclosure.

FIG. 1 is a view illustrating a configuration of a turbocharged engine exhaust system in which the connection portion between a turbocharger and a WCC is sealed by a gasket having a difference in cross section height in accordance with an embodiment of the present disclosure.

Figure 1A:
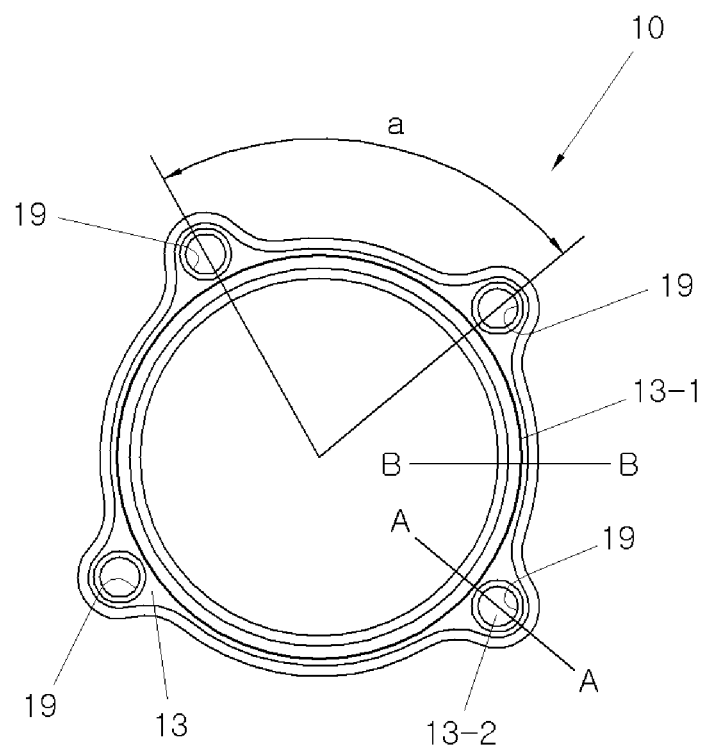
FIG. 1a is a cross section view taken along line C-C of FIG. 1.

As illustrated in FIGS. 1-1a, a turbocharged engine exhaust system may include a turbocharger 1, a warm-up catalytic converter (WCC) 3, and a gasket 10 configured to maintain sealing between the turbocharger 1 and the WCC 3 with a bolting force from a plurality of stud bolts 5. The turbocharger 1 is rotated by exhaust gasses discharged from an engine, and supplies the engine with intake air through turbocharging. In addition, the turbocharger 1 is additionally provided on one side thereof with a turbocharger flange 1-1, which is joined to the WCC 3 by the plurality of stud bolts 5 to create a bolting force. The WCC 3 removes hazardous substances, such as $NO_X$, included in exhaust gasses. In addition, the WCC 3 is additionally provided on one side thereof with a WCC flange 3-1, which is joined to the turbocharger flange 1-1 of the turbocharger 1 by the plurality of stud bolts 5 to form a bolting force.

Specifically, the gasket 10 may include a sealing plate 11, a pressure plate 13, a sealing mass 15, a reinforcement core 17, and a stud core 19. The gasket 10 may be located between the turbocharger flange 1-1 of the turbocharger 1 and the WCC flange 3-1 of the WCC 3, wherein sealing between the turbocharger flange 1-1 and the WCC flange 3-1 is formed by a strong force applied by the bolting force which connects the turbocharger 1 and the WCC 3, and such a strong sealing property prevents leakages of exhaust gasses flowing from the turbocharger 1 to the WCC 3. As compared with an existing WCC gasket, the gasket 10 is superior in view of the sealing performance and the surface pressure characteristic after deterioration, and has a characteristic in which a stud bolt loosening problem is removed.

Figure 2:
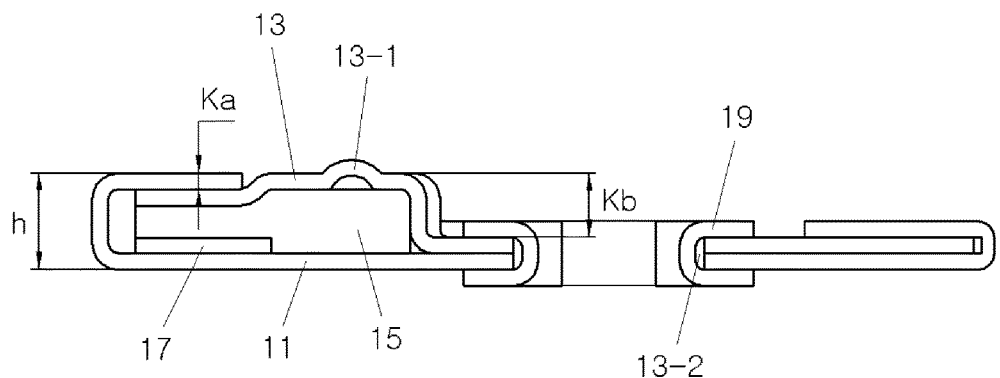
FIG. 2 is a cross section taken along line A-A of FIG. 1a illustrating a detailed configuration of a gasket having a difference in cross section height in accordance with an embodiment of the present disclosure.
Figure 2A:
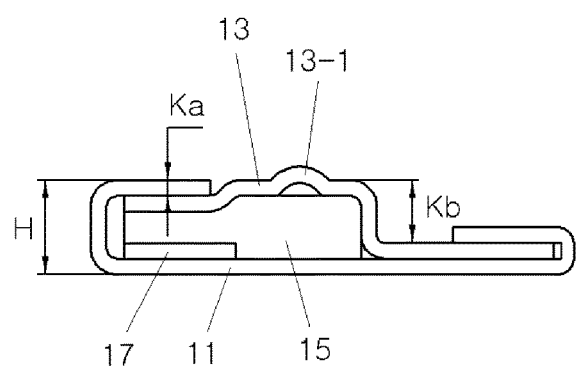
FIG. 2a is a cross section taken along line B-B of FIG. 1a in accordance with an embodiment of the present disclosure.

A detailed configuration of the gasket 10 for implementing the aforementioned characteristics is illustrated in FIGS. 2-2a.

Specifically, the sealing plate 11 may be configured in a looped ring structure in which a hoop having a predetermined width is formed with a central hole bored therethrough, and is provided at each 90 degree position thereof with a stud core formation part having a bored stud hole so that a stud core 19 can be connected therein. The sealing plate 11 may be provided at one side thereof with an outside folded edge portion folded on the pressure plate 13 which is stacked on the sealing plate 11, and is provided at the other side thereof with an inside folded edge portion folded on the pressure plate 13 which is stacked on the reinforcement core 17 and the sealing mass 15, thereby forming a difference in height between the inside edge and the outside edge. In addition, the sealing plate 11 may be made of stainless steel (SS) and take deterioration by high-temperature exhaust gas into consideration.

Specifically, the pressure plate 13 may be configured in a looped ring structure in which a hoop having a predetermined width is formed with a central hole bored therethrough, and is provided at each 90 degree position thereof with a stud core formation part having a bored stud hole 13-1 so that a stud core 19 can be connected therein. The pressure plate 13 may be provided at one side thereof with an outside edge portion fixed by the outside folded edge portion of the sealing plate 11, and may be provided at the other side thereof with an inside edge portion fixed by the inside folded edge portion of the sealing plate 11 in a state in which the inside edge portion is stacked on the reinforcement core 17 and the sealing mass 15, thereby forming a difference in height between the inside edge and the outside edge. In addition, the pressure plate 13 is provided at the inside edge portion thereof with at least one step section, and is provided in the step section with at least one sealing bead 13-2 which has protruded. In addition, the pressure plate 13 may be made of SS and take deterioration by high-temperature exhaust gas into consideration.

Specifically, the sealing mass 15 may be manufactured by tone formation of 30-35% using appropriate compression force, thereby having variability of varying the amount of compression depending on an applied pressure, as well as flexibility. To this end, the sealing mass 15 may be made of various materials, but is preferred to be made of mica by taking deterioration by high-temperature exhaust gas into consideration. In a state in which the sealing mass 15 is stacked together with the reinforcement core 17 on the inside edge portion of the sealing plate 11, the inside edge portion of the pressure plate 13 is stacked on the sealing mass 15. Accordingly, the sealing mass 15 is fixed by the inside folded edge portion of the sealing plate 11.

Specifically, the reinforcement core 17 may be made of SS and take deterioration by high-temperature exhaust gas into consideration. In a state in which the reinforcement core 17 is located on the inside edge portion of the sealing plate 11, the sealing mass 15 is stacked on the reinforcement core 17.

The stud core 19 may be provided with a hole through which the stud bolts 5 passes, and a female screw is formed on the inner circumferential surface of the hole. The stud core 19 may be compressed to the sealing plate 11 and the pressure plate 13 at a state in which the stud core 19 is inserted into the stud holes of the sealing plate 11 and pressure plate 13, thereby forming strong fixation power. In addition, the stud core 19 may be made of an SS and take deterioration by high-temperature exhaust gas into consideration.

Figure 3:
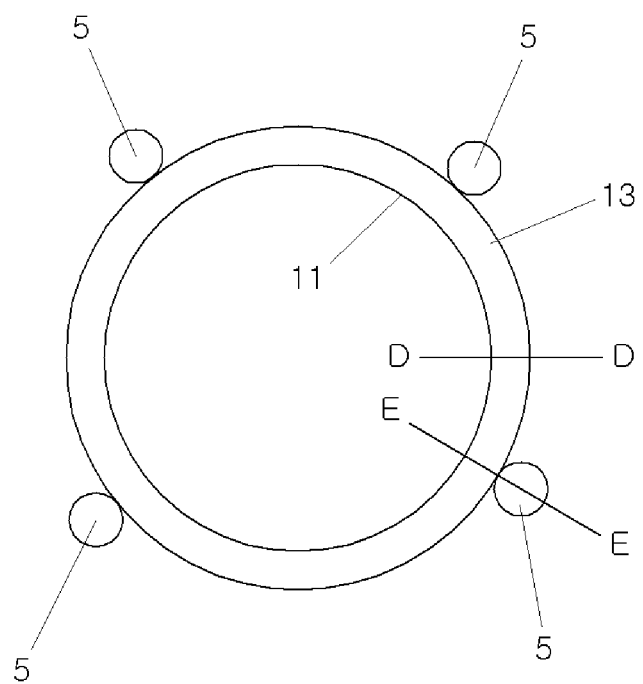
FIG. 3 is a view showing a state in which the sealing of the connection portion between a turbocharger and a WCC is maintained.
Figure 3A:
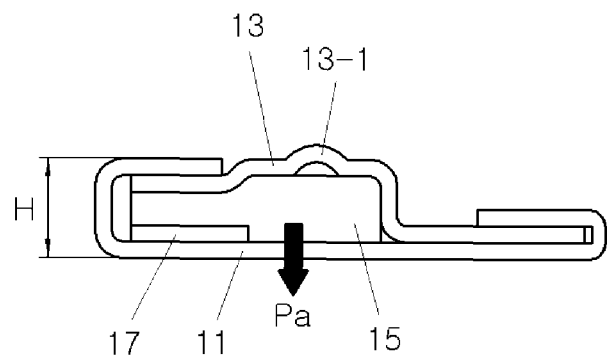
FIG. 3a is a cross section taken along line D-D of FIG. 3.
Figure 3B:
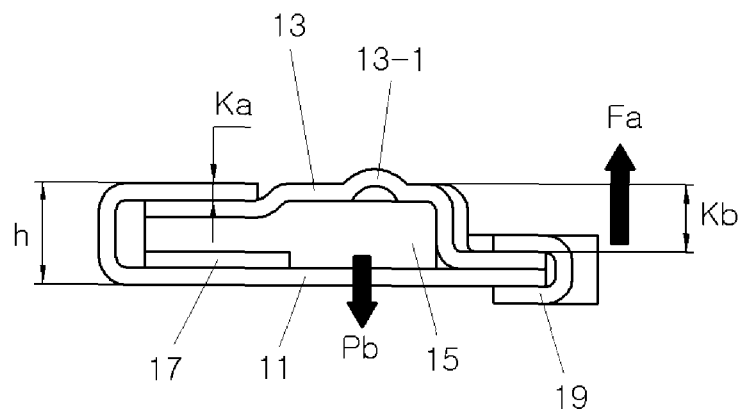
FIG. 3b is a cross section taken along line E-E of FIG. 3 according to an embodiment of the present disclosure.

The constituent elements of the gasket 10 implement the principal characteristics as follows, and principal characteristics can be confirmed through FIGS. 3-3b.

First, the gasket 10 may be made of SS, and can ensure robustness of the outside bolting portion, which is joined with the stud bolts 5, by the outside edge portions of the sealing plate 11 and pressure plate 13 integrated with the stud core 19. Through this, the durability of the gasket 10 is improved, and collapse of the inside bolting portion is prevented, so that performance against leaks is improved.

Second, the gasket 10 may be configured such that the inside portion of the pressure plate 13, which is stacked on the reinforcement core 17 and sealing mass 15 stacked on the sealing plate 11, is formed to have an exhaust flow path outside step Kb which is different in height from an exhaust flow path inside step Ka, so that the step Kb increases the surface pressure of the sealing portion on the inner side portion through which exhaust gas passes, thereby preventing leaks of exhaust gasses.

Third, in the gasket 10, the reinforcement core 17 may enable the inside bolting portion of the gasket 10, in which the sealing plate 11, sealing mass 15 and pressure plate 13 are integrated, to ensure robustness. The thickness of the sealing mass 15 is reduced by the inside folded edge portion of the sealing plate 11, so that the sealing mass 15 is prevented from collapsing, thereby improving sealing performance and the performance against leaks.

Fourth, in the gasket 10, an additional sealing action with respect to the inside portion may be implemented by the sealing bead 13-2 of the pressure plate 13, thereby improving performance against leaks.

Fifth, since the sealing mass 15 manufactured by tone formation of 30-35% is applied to the gasket 10, the sealing mass having a second height "h" may be formed at the bolting portion of the stud core 19 to which the bolting force Fa of the stud bolts 5 is directly applied, while the sealing mass having a first height "H" may be formed at the peripheral portion of the stud core 19 to which the bolting force Fa of the bolts is not directly applied. Accordingly, even in the remaining portions except for the four joining portions of the stud bolts 5, a strong adhesion may be formed by the sealing mass having the first height "H" which is greater than the sealing mass having the second height "h", so that the adhesions Pa and Pb of the gasket 10 adhered between the turbocharger 1 and the WCC 3 are formed to be the same as each other, thereby improving sealing performance.

As described above, in accordance with an embodiment of the present disclosure, the turbocharged engine exhaust system may include the gasket 10 which is located between the turbocharger flange 1-1 of the turbocharger 1 and the WCC flange 3-1 of the WCC 3, and may be made of mica formed by tone formation of 30-35% so that the amount of compression strain of the sealing mass around a portion to which the bolting force is directly applied can be greater than the amount of compression strain of the sealing mass in the remaining portion to which the bolting force is not directly applied. Accordingly, the surface adhesion between the turbocharger 1 and the WCC 3 may be uniformly formed. Since the gasket 10 is made of SS, damage by deterioration due to high-temperature exhaust gasses may be reduced, so that the bolting force of the stud bolts 5 may be prevented from being weakened due to vibrations of the engine, thereby preventing exhaust gasses from leaking.

In accordance with an exemplary embodiments of the present disclosure, the gasket joined by the plurality of bolts between the turbocharger and the WCC may form a uniform adhesion to the respective surfaces of the turbocharger and WCC by a difference between the height of the cross section of a bolting-force-concentrated portion and the height of the cross section of the remaining portion, so that the surface pressure capability and the sealing performance can be maintained even after deterioration by high-temperature exhaust gasses. Since the durability is maintained in spite of deterioration by high-temperature exhaust gasses and vibrations of the engine, leaks of exhaust gasses due to a weakening of joining force can be prevented.

In addition, according to the turbocharged engine exhaust system in accordance with an embodiment of the present disclosure, since leaks of exhaust gasses are prevented by the gasket having a difference in cross section height, it is possible to meet environmental regulations, such as LEV-III, EU6 and China 5.

While the present disclosure has been described with respect to the specific embodiments, it will be apparent to those skilled in the art that various changes and modifications may be made without departing from the spirit and scope of the disclosure as defined in the following claims.

What is claimed is:

1. A turbocharged engine exhaust system mounted with a gasket having a difference in cross section height, the turbocharged engine exhaust system comprising:
   a turbocharger rotatable by exhaust gasses discharged from an engine, and able to supply the engine with intake air through turbocharging;
   a warm-up catalytic converter (WCC) for removing hazardous substances in exhaust gasses discharged from the engine; and
   the gasket located between a turbocharger flange of the turbocharger and a WCC flange of the WCC, receiving a bolting force of stud bolts which pass through the turbocharger flange and the WCC flange, and operating such that the amount of compression strain of a sealing mass around a portion to which the bolting force is directly applied is greater than the amount of compression strain of the sealing mass in the remaining portion to which the bolting force is not directly applied,
   wherein the sealing mass is located between a sealing plate and a pressure plate, wherein the sealing plate and the pressure plate are configured in a ring shape having a hoop with bored stud holes, in which the stud bolts are joined, and overlap each other, and
   wherein the pressure plate has a step section at an inside edge of the pressure plate, and the step section has a protruding sealing bead formed thereon.

2. The turbocharged engine exhaust system of claim 1, wherein an inside edge of the sealing plate is formed as an inside folded edge portion which is folded on the inside edge of the pressure plate, and an outside edge of the sealing plate is formed as an outside folded edge portion which is folded on an outside edge of the pressure plate.

3. The turbocharged engine exhaust system of claim 2, wherein the sealing plate is disposed on the inside edge of the sealing plate with a reinforcement core, and the sealing mass is stacked on the reinforcement core.

4. The turbocharged engine exhaust system of claim 1, wherein stud cores are joined in the stud holes of the sealing plate and pressure plate, and the stud cores are disposed on the inner circumferential surfaces thereof with female screws which are formed to be connected with the stud bolts.

5. The turbocharged engine exhaust system of claim 1, wherein the sealing plate and the pressure plate comprise stainless steel.

* * * * *